(12) United States Patent
Hellerud et al.

(10) Patent No.: US 10,560,636 B1
(45) Date of Patent: Feb. 11, 2020

(54) CROP SYNCHRONIZED AUTO FOCUS AND EXPOSURE

(71) Applicant: Cisco Technology, Inc., San Jose, CA (US)

(72) Inventors: Erik Hellerud, Oslo (NO); Frode Tjøntveit, Fjellhamar (NO); Anh Duc Dao, Hvalstad (NO)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/662,498

(22) Filed: Jul. 28, 2017

Related U.S. Application Data (60) Provisional application No. 62/476,033, filed on Mar. 24, 2017.

(51) Int. Cl.

| H04N 5/232 | (2006.01) |
|---|---|
| G06T 7/20 | (2017.01) |
| G01S 3/786 | (2006.01) |
| H04N 5/265 | (2006.01) |
| G06T 11/60 | (2006.01) |
| H04N 5/351 | (2011.01) |
| G06T 3/40 | (2006.01) |

(52) U.S. Cl.
CPC ....... *H04N 5/23296* (2013.01); *G01S 3/7864* (2013.01); *G06T 7/20* (2013.01); *G06T 11/60* (2013.01); *H04N 5/23203* (2013.01); *H04N 5/23219* (2013.01); *H04N 5/23238* (2013.01); *H04N 5/265* (2013.01); *H04N 5/351* (2013.01); *G06T 3/4038* (2013.01); *G06T 2207/20132* (2013.01); *G06T 2210/22* (2013.01)

(58) Field of Classification Search
CPC ........... H04N 5/23203; H04N 5/23219; H04N 5/23238; H04N 5/265; H04N 5/23296; H04N 5/351; G06T 3/4038; G06T 7/20; G06T 11/60; G06T 2210/22; G06T 2207/20132; G01S 3/7864
See application file for complete search history.

(56) References Cited

U.S. PATENT DOCUMENTS

| 5,568,183 | A | * | 10/1996 | Cortjens | H04N 5/23203 348/14.05 |
|---|---|---|---|---|---|
| 5,686,957 | A | * | 11/1997 | Baker | G02B 3/0087 348/14.07 |
| 5,929,904 | A | * | 7/1999 | Uchida | H04N 5/232 348/143 |
| 6,977,678 | B1 | * | 12/2005 | Wada | G08B 13/1963 348/143 |
| 7,450,165 | B2 | * | 11/2008 | Ahiska | H04N 5/2259 348/240.2 |
| 7,580,054 | B2 | * | 8/2009 | Rui | H04N 7/142 348/14.01 |

(Continued)

*Primary Examiner* — Lin Ye
*Assistant Examiner* — Chriss S Yoder, III
(74) *Attorney, Agent, or Firm* — Merchant & Gould P.C.

(57) ABSTRACT

Crop synchronized auto focus and exposure may be provided. First, a command corresponding to a new crop region of a sensor of a camera may be received. Then new capture settings corresponding to the new crop region may be obtained. Next, a frame may be captured from the sensor of the camera according to the obtained new capture settings. The captured frame may then be cropped according to the new crop region.

20 Claims, 5 Drawing Sheets

(56) References Cited

U.S. PATENT DOCUMENTS

| | | | |
|---|---|---|---|
| 8,203,593 B2 * | 6/2012 | Mareachen | H04N 7/147 348/14.08 |
| 8,704,908 B1 * | 4/2014 | Aldrich | H04N 5/23212 348/222.1 |
| 8,723,988 B2 * | 5/2014 | Thorn | G06F 3/0488 348/240.99 |
| 9,071,749 B2 | 6/2015 | Hwang et al. | |
| 9,305,331 B2 | 4/2016 | Huang | |
| 9,325,917 B2 | 4/2016 | MacMillan et al. | |
| 9,473,713 B2 | 10/2016 | MacMillan et al. | |
| 9,479,703 B2 | 10/2016 | Yu | |
| 2007/0092244 A1 * | 4/2007 | Pertsel | H04N 5/23248 396/153 |
| 2007/0237506 A1 * | 10/2007 | Minema | G03B 7/093 396/52 |

* cited by examiner

CROP SYNCHRONIZED AUTO FOCUS AND EXPOSURE

RELATED APPLICATION

Under provisions of 35 U.S.C. § 119(e), Applicants claim the benefit of U.S. Provisional Application No. 62/476,033 filed Mar. 24, 2017, which is incorporated herein by reference.

TECHNICAL FIELD

The present disclosure may relate generally to auto focus and exposure.

BACKGROUND

A Pan Tilt Zoom (PTZ) camera is a camera that is capable of remote directional and zoom control. Its name reflects the movement options of the camera. In television production, PTZ controls are used with professional video cameras in television studios, sporting events, and other spaces. They are commonly referred to as robos, an abbreviation of robotic camera. These systems can be remotely controlled by automation systems.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Crop synchronized auto focus and exposure may be provided. First, a command corresponding to a new crop region of a sensor of a camera may be received. Then new capture settings corresponding to the new crop region may be obtained. Next, a frame may be captured from the sensor of the camera according to the obtained new capture settings. The captured frame may then be cropped according to the new crop region.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A camera's exposure and focus may have to be adjusted when the camera captures a new scene. For a conventional PTZ camera, the camera may physically move before it captures a new scene. This movement may make the adjustment acceptable to a viewer because: i) there may be a continuity when moving between scenes; ii) exposure can adjust while the camera is moving; and iii) the movement itself may disturb the video such that adjusting focus and exposure at the destination position is not considered too annoying to a viewer.

In contrast, framing a new scene in a Digital PTZ (DPTZ) camera may be based on taking a different crop from the camera's sensor. One advantage of the DPTZ camera may be that this new scene framing may happen from one frame to the next. However, adjusting the exposure and the focus after the new scene is captured with the DPTZ camera may produce an artifact annoying to the viewer because the adjustment in exposure and focus may take several seconds and may be visible to the viewer. In order to minimize this artifact due to scene changes in a DPTZ camera, the exposure and the focus changes may need to be handled quickly.

A DPTZ operation may comprise selecting a scene from a different part of the camera's sensor and resizing it to match a desired output size. This may be achieved by cropping either a processed image or cropping the sensor data itself. For example, consistent with embodiments of the disclosure, the camera (e.g., DPTZ camera) may receive a crop command and change the crop from a first crop region (e.g., region A) to a second crop region (e.g., region B) on the first available frame. Then an auto exposure/auto focus (AE/AF) process may adjust on the new crop region data (e.g., for the second crop region). One problem may be that this frame may have optimized camera settings for the first crop region that may not necessarily look good for the second crop region because different scenes may have different lighting conditions and different distances to relevant objects for example. The result may be that the first image from the new scene (i.e., the second crop region) may be out of focus, underexposed, or overexposed. Even if the AE/AF process managed to finish the adjustments within a few frames, these changes may be visible to the viewer because: i) the changed focus and exposure settings; and ii) the coding artifacts that may result from the adjustment.

Embodiments of the disclosure may provide a solution based on scene analysis and instantaneous adjustment of sensor settings, motor positions, and crop region on the same frame. By synchronizing these changes, it may be possible to make large changes to sensor and/or focus settings while keeping these changes hidden from the viewer.

Figure 1:
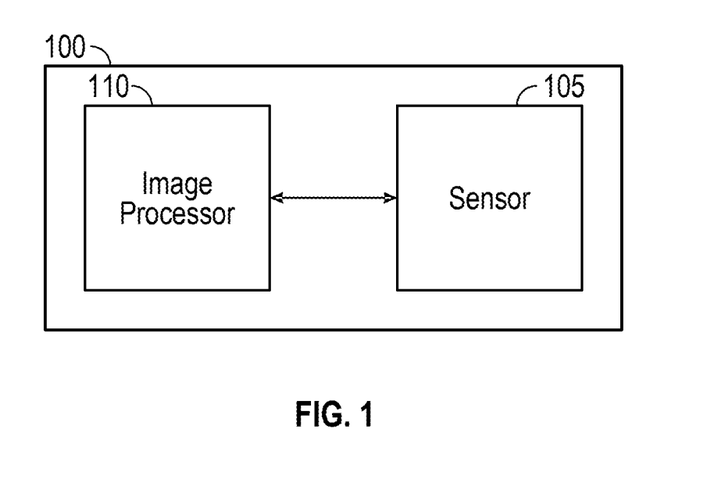
FIG. 1 is a block diagram of a camera.

FIG. 1 is a block diagram of a camera 100 for providing crop synchronized auto focus and exposure. Camera 100 may comprise, but is not limited to, a Digital Pan Tilt Zoom (DPTZ) camera comprising a high-resolution camera that may digitally zoom and pan into portions of an image with no physical camera movement. As shown in FIG. 1, camera 100 may comprise a sensor 105 and an image processor 110. Sensor 105 may comprise, but is not limited to, a high-resolution Complementary Metal Oxide Semiconductor (CMOS) digital image sensor. Image processor 110 may comprise, but is not limited to, a computing device 500.

Computing device 500 may be described in greater detail below with respect to FIG. 5.

Figure 2:
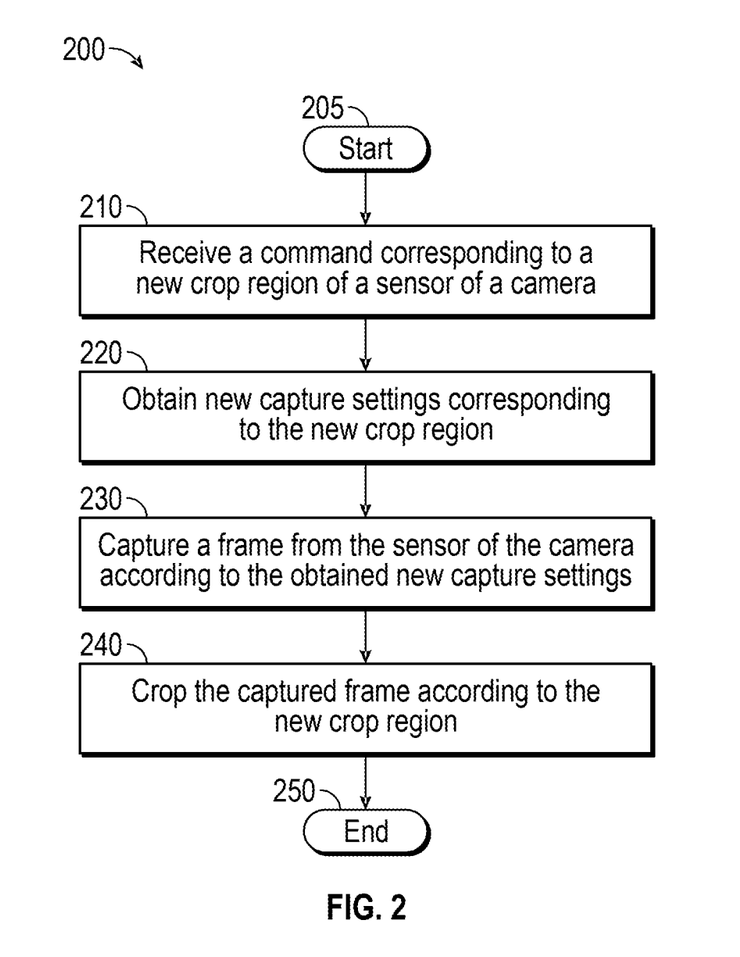
FIG. 2 is a flow chart of a method for providing crop synchronized auto focus and exposure.

FIG. 2 is a flow chart setting forth the general stages involved in a method 200 consistent with an embodiment of the disclosure for providing crop synchronized auto focus and exposure. Method 200 may be implemented using image processor 110 as described in more detail above with respect to FIG. 1. Ways to implement the stages of method 200 will be described in greater detail below.

Figure 3:
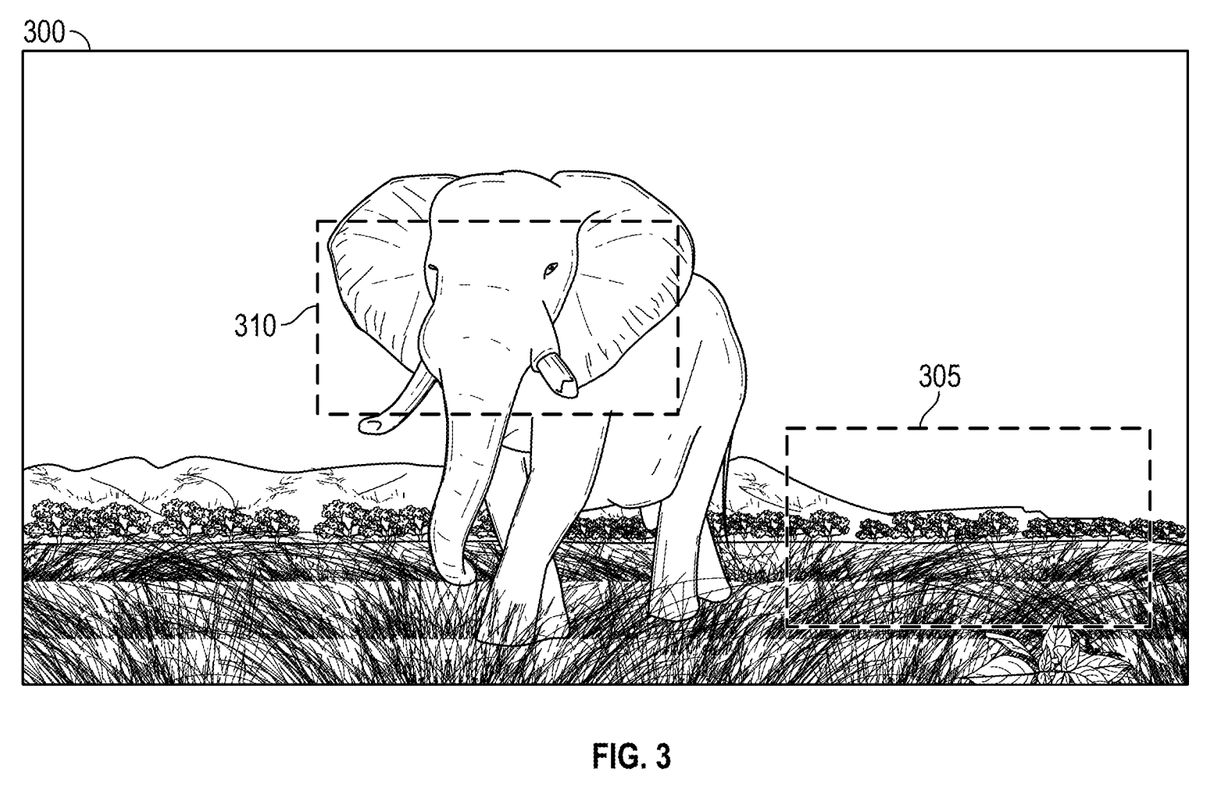
FIG. 3 shows an image in a frame.

Method 200 may begin at starting block 205 and proceed to stage 210 where image processor 110 may receive a command corresponding to a new crop region of sensor 105 of camera 100. FIG. 3 shows an image in a frame 300. Frame 300 may be sensed by sensor 105. A first scene may be contained in a first crop region 305 and a second scene may be contained in a second crop region 310. For example, as shown in FIG. 3, image processor 110 may receive the crop command and change the crop from first crop region 305 to a new crop region (e.g., second crop region 310) on frame 300.

From stage 210, where image processor 110 receives the command corresponding to the new crop region of sensor 105 of camera 100, method 200 may advance to stage 220 where image processor 110 may obtain new capture settings corresponding to the new crop region. For example, finding the correct camera settings for the new crop may comprise obtaining (e.g., from memory) previous settings from a previous time that the new crop region (or a similar crop) was used. This may require that the new crop region has actually been used before and that the scene has not changed or has changed slightly. Initially, when the AE/AF process has not done any analysis on any part of the sensor image, the fallback may be a normal AE/AF adjustment, though a quicker and less smooth adjustment may be needed. If the crop is new, but the AE/AF has been able to adjust on some part of the sensor image once or more, the AE/AF process has some information of the conditions in the new crop. This information may be complete or incomplete. Complete information may be obtained if, during the AF/AE adjustment for different crops, the optimum settings for the new crop are seen. Incomplete information may happen, for instance, if the new crop is in a part of the sensor that is totally blown out, or that the lens is far from being in focus.

When adjusting for a new crop based on previous history, it may be possible that the scene has changed since that crop was used the last time. This may be detected by comparing statistics for that region with historical data. In a speaker tracking system, it may also be possible to detect if a previous crop is reused for a new speaker (e.g., a person speaking) in a different position based on the audio triangulation data. In this case, that may have to be compensated for by the AF process. Nevertheless, embodiments of the disclosure may be able to do most of the adjustments between two frames, which may give a good starting point for further smaller AE/AF adjustments.

Figure 4:
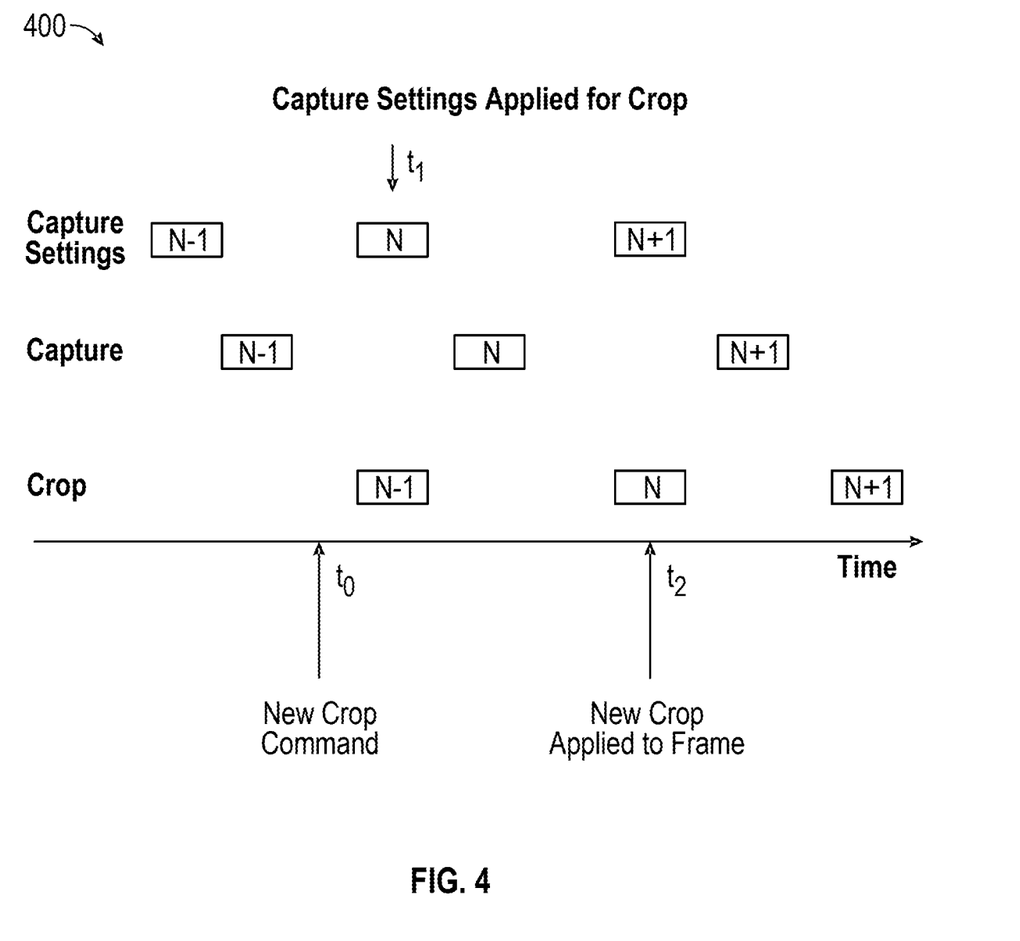
FIG. 4 illustrates a camera pipeline.

Once image processor 110 obtains the new capture settings corresponding to the new crop region in stage 220, method 200 may continue to stage 230 where image processor 110 may capture a frame from sensor 105 of camera 100 according to the obtained new capture settings. For example, the focus and exposure changes may be synchronized with the crop change. FIG. 4 illustrates a camera pipeline 400. In camera pipeline 400, several frames may be processed at the same time. This may mean that, in order to synchronize the settings, embodiments of the disclosure may change the capture settings for a not yet captured frame, let that frame pass through the camera pipeline, and crop on the final processed frame.

When the AE/AF processes are signaled to optimize hardware settings for a new crop region, the hardware settings can be selected freely. Freely in the sense that it may not be necessary to consider smooth transitions. There may still be limitations to what adjustments are possible, particularly when moving physical motors for focus and iris. In practice, the motors may be moved significantly further between frames then what would be done during conventional adjustments. For the AF processes, this may mean that the focus motor may be moved to what is expected to be a position close to the optimum focus location between frames, which may make it possible to do a minor focus search on the live video stream.

After image processor 110 captures the frame from sensor 105 of camera 100 according to the obtained new capture settings in stage 230, method 200 may proceed to stage 240 where image processor 110 may crop the captured frame according to the new crop region. For example, as stated above, image processor 110 may receive a request for a new crop and coordinates for the new crop region. Then based, for example, on scene analysis, the new settings for gain (i.e., ISO of sensor 105 or amplification), iris (i.e., aperture), and focus may be applied for the next frame (e.g., frame N in camera pipeline 400). Since frame N may be the first to have the new crop applied, the sensor and motor settings can be set freely as discussed above. Frame N may be captured and processed in camera pipeline 400. Next, frame N may be cropped according to the new crop region (e.g., second crop region 310). Once image processor 110 crops the captured frame according to the new crop region in stage 240, method 200 may then end at stage 250.

FIG. 4 shows the flow through the camera pipeline 400. A new crop command may be received at $t_0$ and the sensor settings for the next possible frame (frame N) may be changed at $t_1$. When this frame (i.e., frame N) has passed through camera pipeline 400, the new crop may be applied at $t_2$. As shown by camera pipeline 400, there may be no need to freeze the image as long as the adjustment is applied to the same frame as the crop the changes may not be seen.

Frames older than N may pass though camera pipeline 400 as before, but they may be cropped according to the old crop region (e.g., first crop region 305). The first frame (i.e., N−1) may be cropped according to the old crop region (e.g., first crop region 305) even though the new crop region (e.g., second crop region 310) has been received. The new crop region may first be applied when frame N reaches the crop function at $t_2$. This may mean that there may be a delay for cropping identical to a camera pipeline delay.

Figure 5:
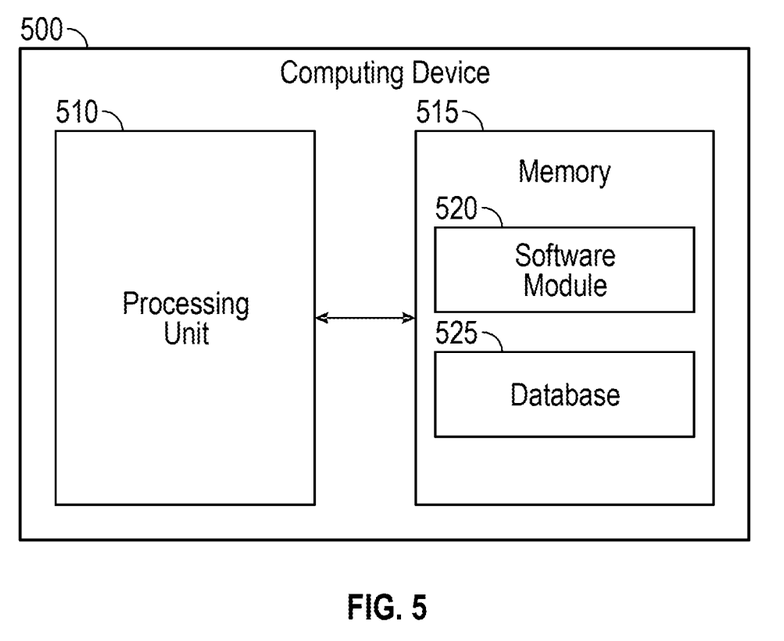
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform processes for providing crop synchronized auto focus and exposure, including for example, any one or more of the stages from method 200 described above with respect to FIG. 2.

Computing device 500 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a camera, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    receiving a crop command corresponding to a new crop region of a sensor of a camera;
    obtaining new capture settings corresponding to the new crop region;
    capturing a first frame and a second frame from the sensor of the camera, wherein capturing the first frame and the second frame comprises,
        capturing the first frame according to old capture settings corresponding to an old crop region prior to receiving the crop command corresponding to the new crop region and prior to applying the obtained new capture settings, and
        capturing the second frame according to the obtained new capture settings subsequent to receiving the crop command corresponding to the new crop region and subsequent to applying the new obtained capture settings;
    cropping, subsequent to receiving the crop command corresponding to the new crop region and prior to capturing the second frame, the captured first frame according to the old crop region; and
    cropping, subsequent to receiving the crop command corresponding to the new crop region and prior to capturing a third frame that is subsequent to the second frame, the captured second frame according to the new crop region.

2. The method of claim 1, wherein obtaining the new capture settings corresponding to the new crop region comprises obtaining the new capture settings comprising a focus setting for the new crop region.

3. The method of claim 1, wherein obtaining the new capture settings corresponding to the new crop region comprises obtaining the new capture settings comprising an exposure setting for the new crop region.

4. The method of claim 1, wherein obtaining the new capture settings corresponding to the new crop region comprises obtaining the new capture settings comprising an exposure setting for the new crop region, wherein the exposure setting comprises a gain for the sensor.

5. The method of claim 1, wherein obtaining the new capture settings corresponding to the new crop region comprises obtaining the new capture settings comprising an exposure setting for the new crop region, wherein the exposure setting comprises an iris setting.

6. The method of claim 1, wherein obtaining the new capture settings corresponding to the new crop region comprises obtaining the new capture settings comprising previous capture settings from a previous time that the new crop region was used.

7. The method of claim 1, wherein obtaining the new capture settings corresponding to the new crop region comprises obtaining the new capture settings comprising previous capture settings from a previous time that a crop region similar to the new crop region was used.

8. The method of claim 1, wherein obtaining the new capture settings corresponding to the new crop region comprises obtaining the new capture settings from an auto exposure/auto focus (AE/AF) process performed by the camera.

9. The method of claim 1, wherein receiving the crop command corresponding to the new crop region of the sensor of the camera comprises receiving the crop command corresponding to the new crop region of the sensor of the camera comprising a Digital PTZ (DPTZ) camera.

10. A system comprising:
a memory storage; and
a processing unit coupled to the memory storage, wherein the processing unit is operative to:
receive a crop command corresponding to a new crop region of a sensor of a camera;
obtain new capture settings corresponding to the new crop region;
capture a first frame and a second frame from the sensor of the camera wherein the processing unit being operative to capture the first frame and the second frame comprises the processing unit being operative to,
capture the first frame according to old capture settings corresponding to an old crop region prior to receiving the crop command corresponding to the new crop region and prior to applying the obtained new capture settings, and
capture the second frame according to the obtained new capture settings subsequent to receiving the crop command corresponding to the new crop region and subsequent to applying the new obtained capture settings;
crop, subsequent to receiving the crop command corresponding to the new crop region and prior to capturing the second frame, the captured first frame according to the old crop region; and
crop, subsequent to receiving the crop command corresponding to the new crop region and prior to capturing a third frame that is subsequent to the second frame, the captured second frame according to the new crop region.

11. The system of claim 10, wherein new capture settings comprise a focus setting for the new crop region.

12. The system of claim 10, wherein the new capture settings comprise an exposure setting for the new crop region.

13. The system of claim 12, wherein the exposure setting comprises at least one of the following: a gain for the sensor and an iris setting.

14. The system of claim 10, wherein the new capture settings comprising at least one of the following: previous capture settings from a previous time that the new crop region was used; and previous capture settings from a previous time that a crop region similar to the new crop region was used.

15. A non-transitory computer-readable medium that stores a set of instructions which when executed perform a method comprising:
receiving a crop command corresponding to a new crop region of a sensor of a camera;
obtaining new capture settings corresponding to the new crop region;
capturing a first frame and a second frame from the sensor of the camera wherein capturing the first frame and the crop second frame comprises,
capturing the first frame according to old capture settings corresponding to an old crop region prior to receiving the crop command corresponding to the new crop region and prior to applying the obtained new capture settings, and
capturing the second frame according to the obtained new capture settings subsequent to receiving the crop command corresponding to the new crop region and subsequent to applying the new obtained capture settings;
cropping, subsequent to receiving the crop command corresponding to the new crop region and prior to capturing the second frame, the captured first frame according to the old crop region; and
cropping, subsequent to receiving the crop command corresponding to the new crop region and prior to capturing a third frame that is subsequent to the second frame, the captured second frame according to the new crop region.

16. The non-transitory computer-readable medium of claim 15, wherein obtaining the new capture settings corresponding to the new crop region comprises obtaining the new capture settings comprising a focus setting for the new crop region.

17. The non-transitory computer-readable medium of claim 15, wherein obtaining the new capture settings corresponding to the new crop region comprises obtaining the new capture settings comprising an exposure setting for the new crop region.

18. The non-transitory computer-readable medium of claim 15, wherein obtaining the new capture settings corresponding to the new crop region comprises obtaining the new capture settings comprising an exposure setting for the new crop region, wherein the exposure setting comprises a gain for the sensor.

19. The non-transitory computer-readable medium of claim 15, wherein obtaining the new capture settings corresponding to the new crop region comprises obtaining the new capture settings comprising an exposure setting for the new crop region, wherein the exposure setting comprises an iris setting.

20. The non-transitory computer-readable medium of claim 15, wherein obtaining the new capture settings corresponding to the new crop region comprises obtaining the new capture settings comprising at least one of the following: previous capture settings from a previous time that the new crop region was used; and previous capture settings from a previous time that a crop region similar to the new crop region was used.

* * * * *